(12) United States Patent
Hsu et al.

(10) Patent No.: US 11,774,745 B2
(45) Date of Patent: Oct. 3, 2023

(54) LIGHT PATH ADJUSTMENT MECHANISM

(71) Applicant: Young Optics Inc., Hsinchu (TW)

(72) Inventors: Sheng-Ya Hsu, Hsinchu (TW);
Yu-Chen Chang, Hsinchu (TW);
Han-Min Chiu, Hsinchu (TW);
Wei-Szu Lin, Hsinchu (TW)

(73) Assignee: YOUNG OPTICS INC., Hsinchu (TW)

( * ) Notice: Subject to any disclaimer, the term of this patent is extended or adjusted under 35 U.S.C. 154(b) by 231 days.

(21) Appl. No.: 17/155,990

(22) Filed: Jan. 22, 2021

(65) Prior Publication Data

US 2021/0141213 A1 May 13, 2021

Related U.S. Application Data

(63) Continuation of application No. 16/222,469, filed on Dec. 17, 2018, now abandoned.

(30) Foreign Application Priority Data

Dec. 22, 2017 (TW) .................................. 106145342

(51) Int. Cl.
*G02B 26/08* (2006.01)
*G09G 3/00* (2006.01)
*H04N 9/31* (2006.01)

(52) U.S. Cl.
CPC ..... *G02B 26/0816* (2013.01); *G02B 26/0875* (2013.01); *G09G 3/007* (2013.01); *H04N 9/3188* (2013.01)

(58) Field of Classification Search
CPC .......................... G02B 26/08; G02B 26/0816; G02B 26/0833; G02B 26/085; G02B 26/0875; G02B 26/10; G02B 26/105; G02B 26/101; G02B 26/127; G02B 7/02; G02B 7/021; G02B 7/023; G02B 7/026; G02B 7/18;
(Continued)

(56) References Cited

U.S. PATENT DOCUMENTS 9,213,223 B2    12/2015  Mashitani
2006/0245023 A1* 11/2006  Akedo ................. G02B 26/085
                                                      359/223.1
(Continued)

FOREIGN PATENT DOCUMENTS

CN    100549758 C    10/2009
CN    106291917 A     1/2017
(Continued)

*Primary Examiner* — Marin Pichler
(74) *Attorney, Agent, or Firm* — MUNCY, GEISSLER, OLDS & LOWE, P.C.

(57) ABSTRACT

A light path adjustment mechanism includes a support, a carrier, an optical plate member, a permanent magnet and an electromagnet. The carrier is disposed in the support and connected to the support by a first elastic member and a second elastic member, the first elastic member and the second elastic member are configured to twist substantially about a first axial direction, and the optical plate member is disposed on the carrier. An attractive force or a repulsive force generated between the permanent magnet and the electromagnet acts in a direction substantially perpendicular to the first axial direction, and one end of the carrier is provided with the permanent magnet or the electromagnet.

20 Claims, 8 Drawing Sheets

(58) Field of Classification Search
CPC .............. G02B 7/1821; G02B 21/0036; G02B 21/0048; G09G 3/007; H09N 9/3188
USPC ......... 359/221.2, 197.1, 198.1, 199.1, 199.3, 359/200.7, 209.1, 210.2, 212.1, 212.2, 359/213.1, 214.1, 215.1, 220.1, 221.1, 359/223.1, 224.1, 226.1, 226.2
See application file for complete search history.

(56) References Cited

U.S. PATENT DOCUMENTS

| | | |
|---|---|---|
| 2006/0284790 A1* | 12/2006 | Tegreene ........... G02B 27/0101 345/7 |
| 2010/0182492 A1 | 7/2010 | Choi |
| 2015/0293349 A1* | 10/2015 | Matozaki ............. H04N 9/3135 359/198.1 |
| 2016/0077962 A1 | 3/2016 | Ehrlich et al. |
| 2016/0037575 A1 | 12/2016 | Lin et al. |
| 2016/0370575 A1* | 12/2016 | Lin ...................... G02B 26/085 |
| 2016/0377962 A1 | 12/2016 | Mizoguchi |
| 2018/0011285 A1 | 1/2018 | Aschwanden et al. |
| 2019/0278102 A1* | 9/2019 | Suter ................... G02B 27/646 |

FOREIGN PATENT DOCUMENTS

| | | |
|---|---|---|
| TW | I289722 | 11/2007 |
| TW | 200900835 A | 1/2009 |

* cited by examiner

LIGHT PATH ADJUSTMENT MECHANISM

CROSS-REFERENCE TO RELATED APPLICATIONS

This application is a continuation application of application Ser. No. 16/222,469 filed Dec. 17, 2018, the contents of which are incorporated by reference herein.

BACKGROUND OF THE INVENTION a. Field of the Invention

The invention relates generally to an optical mechanism, and more particularly to an light path adjustment mechanism.

b. Description of the Related Art

Nowadays, various image display technologies are widely used in daily life. In order to increase the resolution and picture quality of an image display device, a light path adjustment mechanism can be used to adjust propagation paths of light in the image display device to shift pixel images and thereby increase addressability. However, the number of components, weight and occupied space of a conventional light path adjustment mechanism is considerably large, and thus the entire mechanism is difficult to be miniaturized. Therefore, it is desirable to provide a simple, reliable, light and compact design of a light path adjustment mechanism.

BRIEF SUMMARY OF THE INVENTION

According to one aspect of the present disclosure, a light path adjustment mechanism includes a support, a carrier, an optical plate member, a permanent magnet and an electromagnet. The carrier is disposed in the support and connected to the support by a first elastic member and a second elastic member, the first elastic member and the second elastic member are configured to substantially twist about a first axial direction, and the optical plate member is disposed on the carrier. An attractive force or a repulsive force generated between the permanent magnet and the electromagnet acts in a direction substantially perpendicular to the first axial direction, and one end of the carrier is provided with the permanent magnet or the electromagnet.

In view of the above, at least part of the actuator (such as the permanent magnet or the electromagnet) can be disposed on the carrier to reduce occupied space, weight and component number, thereby realizing a slim and compact light path adjustment mechanism that is advantageously installed in various mini-type electronic devices.

According to another aspect of the present disclosure, a light path adjustment mechanism includes a support, a carrier, a first bar, a second bar and an actuator. The carrier is configured to tilt between at least a first position and a second position about an axis, the carrier includes an optical plate member and a mount, and the mount is integrally formed as one piece with the optical plate member. The first bar is connected with the support and a first end of the carrier, the second bar is connected with the support and a second end of the carrier, and the first bar and the second bar define the axis. The actuator is used for actuating the carrier, the axis dividing the carrier into a first part and a second part, and the actuator is disposed in either the first part or the second part.

In view of the above, the arrangement in which the actuator is disposed in either the first part or the second part of the carrier may further reduce occupied space, weight and fabrication costs. Further, a single actuator that generates both the attractive force and the repulsive force enables the optical plate member to alternately rotate in opposite directions and thus causes the optical plate member to achieve a greater degree of vibration. Therefore, even the actuator is disposed on either the first part or the second part of carrier, a sufficient angular range of rotation can be still provided.

Other objectives, features and advantages of the invention will be further understood from the further technological features disclosed by the embodiments of the invention wherein there are shown and described preferred embodiments of this invention, simply by way of illustration of modes best suited to carry out the invention.

DETAILED DESCRIPTION OF THE INVENTION

In the following detailed description of the preferred embodiments, directional terminology, such as "top," "bottom," "front," "back," etc., is used with reference to the orientation of the Figure(s) being described. The components of the invention can be positioned in a number of different orientations. As such, the directional terminology is used for purposes of illustration and is in no way limiting. Further, "First," "Second," etc, as used herein, are used as labels for nouns that they precede, and do not imply any type of ordering (e.g., spatial, temporal, logical, etc.).

The following description relates in general to a light path adjustment mechanism used with an optical system (e.g., a display device or a projector) to modify or change light paths to enhance image resolution, improve picture quality (e.g., eliminating dark regions or blurring image edges), or provide other beneficial effects. Further, it should be understood that the light path adjustment mechanism is not limited to a specific arrangement and location in the optical system.

Figure 1:
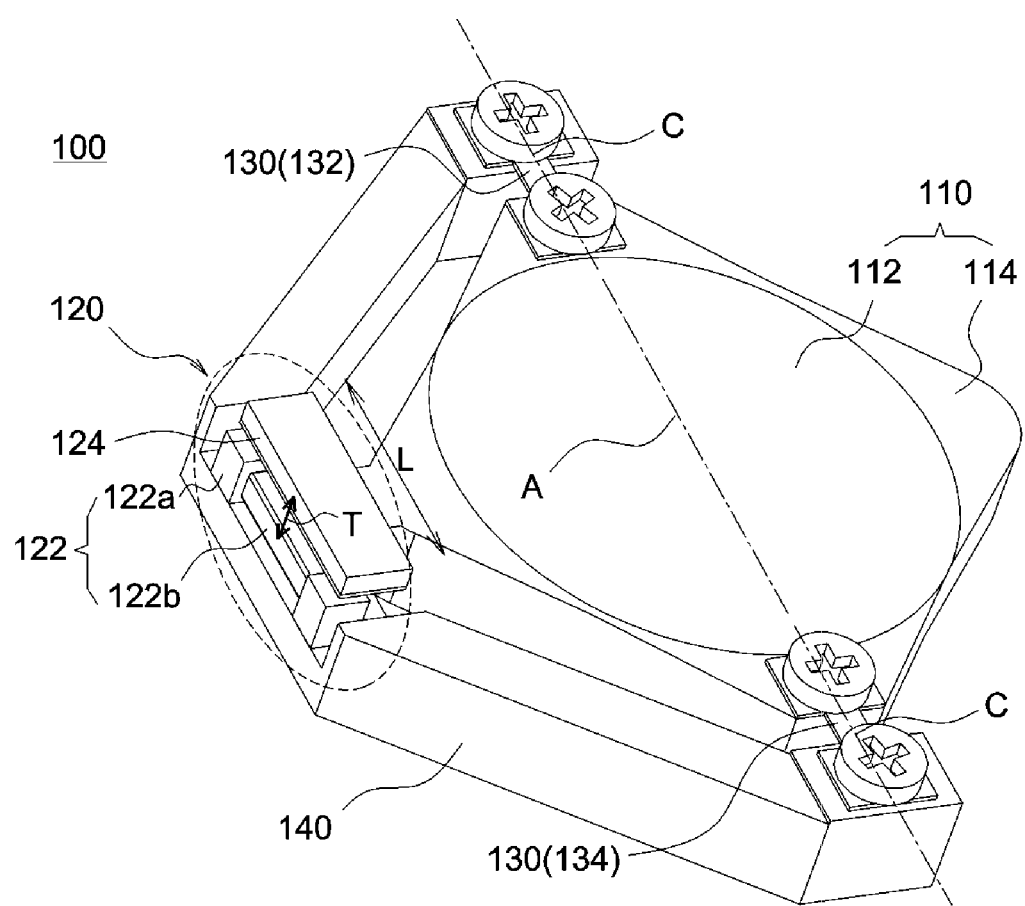
FIG. 1 shows a schematic diagram of a light path adjustment mechanism according to an embodiment of the invention.

FIG. 1 shows a schematic diagram of a light path adjustment mechanism according to an embodiment of the invention. With reference to FIG. 1, a light path adjustment mechanism 100 includes a carrier 110, an actuator 120, at least one elastic member 130 and a support 140. In this embodiment, the carrier 110 may include an optical plate member 112 for reflecting or refracting an incoming light beam and a mount 114 for supporting the optical plate member 112. In other embodiment, the optical plate member 112 for reflecting or refracting an incoming light beam is not a part of the carrier 110 and is disposed on the carrier. The carrier 110 or the mount 114 may be actuated to cause rotation, vibration, or any other form of motion. Further, the optical plate member 112 is not limited to a specific form or structure, so long as it may change, at least to some extent, the traveling direction of incoming light beams. The optical plate member 112 may be, but is not limited to, a lens or a mirror. The mount 114 and the optical plate member 112 may be made from the same material or different materials, and they may be integrally formed as one piece. In this embodiment, the actuator 120 may include an electromagnet 122 and a permanent magnet 124. Herein, the term "permanent magnet" refers to an object made from any material that is magnetized and can create its own persistent magnetic field. The electromagnet 122 may include a core 122a and a coil 122b winding around the core 122a. The permanent magnet 124 may be disposed on one end of the carrier 110, and the electromagnet 122 may be disposed on the support 140. In this embodiment, two elastic members 130 capable of exerting restoring forces are shaped as a first bar 132 and a second bar 134, and two ends of each of the first bar 132 and the second bar 134 are respectively connected with or attached to the support 140 and the carrier 110 through fasteners such as screws or pins, so that the carrier 110 is elastically coupled to the support 140.

Figures 2A, 2B:
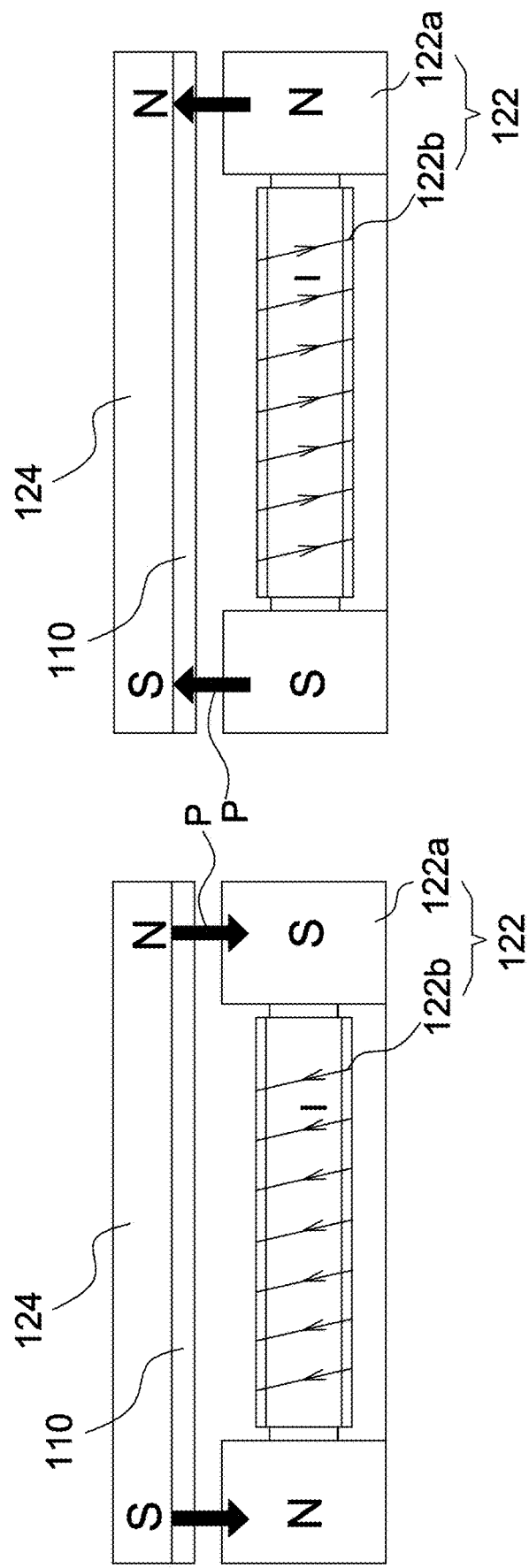
FIGS. 2A and 2B show schematic diagrams illustrating magnetic interaction of an actuator according to an embodiment of the invention.
Figure 3:
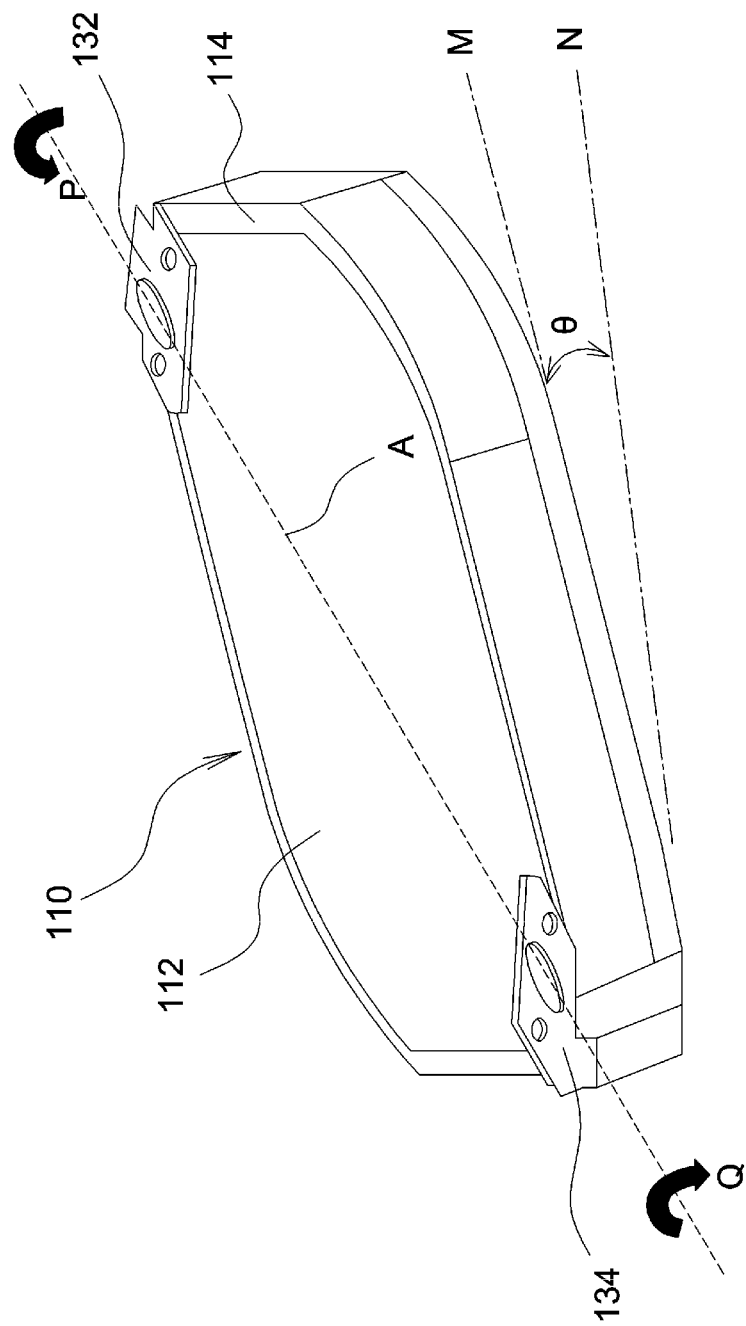
FIG. 3 shows a schematic diagram illustrating an actuated carrier according to an embodiment of the invention.

As shown in FIG. 2A and FIG. 2B, in one embodiment, the permanent magnet 124 is disposed on the carrier 110 and having a south pole S (on the left side) and a north pole N (on the right side). The magnetic polarities of the electromagnet 122 may exchange by varying the flowing direction of a current I in the coil 122b of the electromagnet 122. As shown in FIG. 2A, the electromagnet 122 having a north pole N on the left side and a south pole S on the right side may attract permanent magnet 124 to downwardly pull one end of the carrier 110. In comparison, when the current I flows in an opposite direction as shown in FIG. 2B, the electromagnet 122 turns to have a south pole S on the left side and a north pole N on the right side and thus repels the permanent magnet 124 to upwardly push one end of the carrier 110. Therefore, the electromagnet 122 may alternately attract and repel the permanent magnet 124 by alternating magnetic polarities, which causes the elastic members 130 (first bar 132 and second bar 134) to twist substantially about an axial direction C shown in FIG. 1 and thereby actuate the carrier 110. More specifically, as shown in FIG. 3, in one embodiment, the attraction between the electromagnet 122 and the permanent magnet 124 may cause the carrier 110 with the optical plate member 112 to tilt about an axis A in a direction P to reach a position M, and the repulsion between the electromagnet 122 and the permanent magnet 124 may cause the carrier 110 with the optical plate member 112 to tilt about the axis A in a reverse direction Q to reach another position N. The axis A may be defined by the first bar 132 and second bar 134. Therefore, the optical plate member 112 may tilt about the axis A to various positions within an angular range θ to reflect or refract incoming light beams, which may cause a change in the traveling direction and propagation path of incoming light beams to shift pixel images and thereby increase addressability. In one embodiment, the optical plate member 112 may have an angular range of rotation of about ±1 degree, and preferably ±0.2 to ±0.5 degree. According to the above embodiments, the light path adjustment mechanism is allowed to modify or change light paths to provide beneficial effects according to actual demands, and these beneficial effects may include, but are not limited to, enhancing image resolution and improving picture quality (e.g., eliminating dark regions or blurring image edges).

Referring to FIG. 1 again, in this embodiment, the axis A may substantially coincide with the axial direction C, but the invention is not limited thereto. The axis A may divide the carrier 110 into a first part and a second part. In this embodiment, the electromagnet 122 or the permanent magnet 124 is disposed only in the first part; that is, the electromagnet 122 or the permanent magnet 124 is disposed on only one end (such as the left end shown in FIG. 1) of the carrier 110 to reduce occupied space, weight and fabrication costs. Further, according to the above embodiment, a single actuator 120 may generate both the attractive force and the repulsive force to enable the optical plate member 112 to alternately rotate in opposite directions, causing the optical plate member 112 to achieve a greater degree of vibration. Therefore, even the actuator 120 is disposed on only one side of the optical plate member 112, a sufficient angular range of rotation is still provided. Further, as shown in FIG. 1, in this embodiment, a force at a distance (such as the attractive force or the repulsive force) generated between the permanent magnet 124 and the electromagnet 122 acts in a direction T (such as the attracting direction and the repelling direction shown in FIG. 2A and FIG. 2B), and the direction T is substantially perpendicular to the axial direction C to provide some beneficial effect such as an increase in rotary torque, but the invention is not limited thereto. Further, in one embodiment, the axis A may substantially coincide with the axial direction C, and a longitudinal direction L of the electromagnet 122 or the permanent magnet 124 may substantially parallel to the axis A or the axial direction C.

Figure 4:
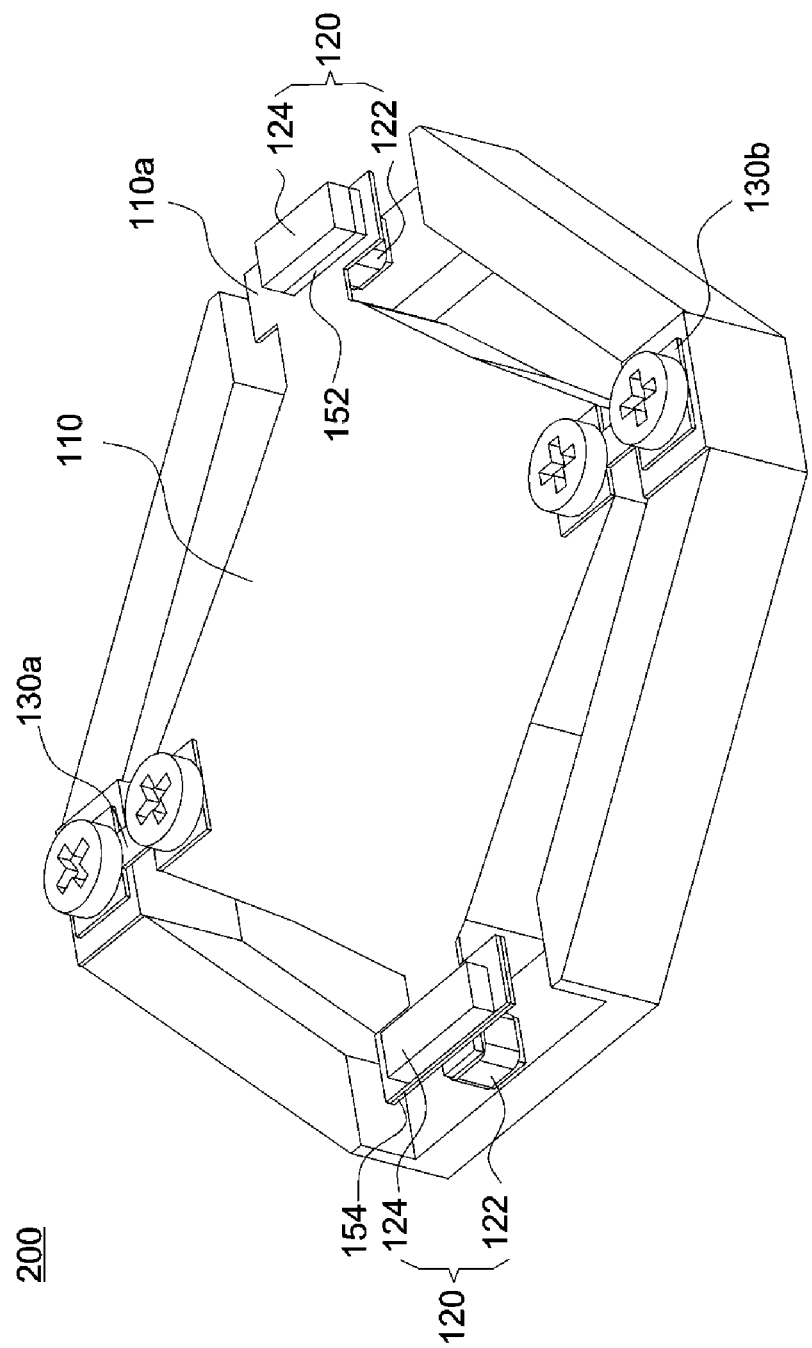
FIG. 4 shows a schematic diagram of a light path adjustment mechanism according to another embodiment of the invention.

As shown in FIG. 4, in other embodiment, the light path adjustment mechanism 200 may include two drive assemblies 120 that are disposed on two sides of the carrier 110, but the invention is not limited thereto. A first elastic member 130a and a second elastic member 130b connect two sides of the carrier 110 with the support 140. Further, the permanent magnet 124 may be disposed on the carrier 110 in various ways. In this embodiment, each of the two sides of the carrier 110 has an extension part 110a, and the permanent magnet 124 is adhered to the extension part 110a. In other embodiment, similar to the attachment of the elastic members 130a and 130b, the permanent magnet 124 may be attached to the carrier 110 by fasteners such as screws or pins. Besides, in one embodiment, a pad 152 may be disposed between the carrier 110 and the permanent magnet 124, or a pad 154 may be disposed between the carrier 110 and the electromagnet 122 to reduce noises caused by the actuated carrier 110.

Figure 5A:
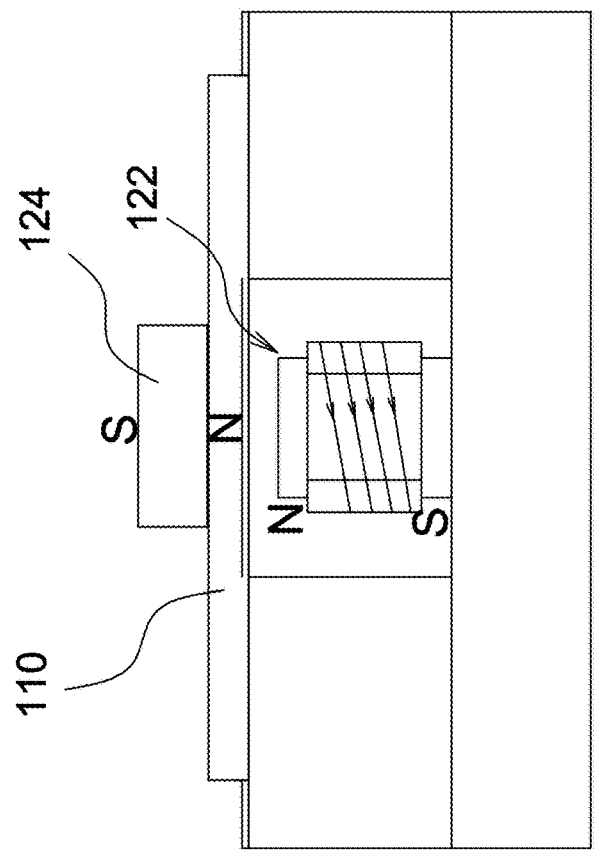
FIGS. 5A and 5B show schematic diagrams illustrating magnetic interaction of an actuator according to another embodiment of the invention.
Figure 5B:
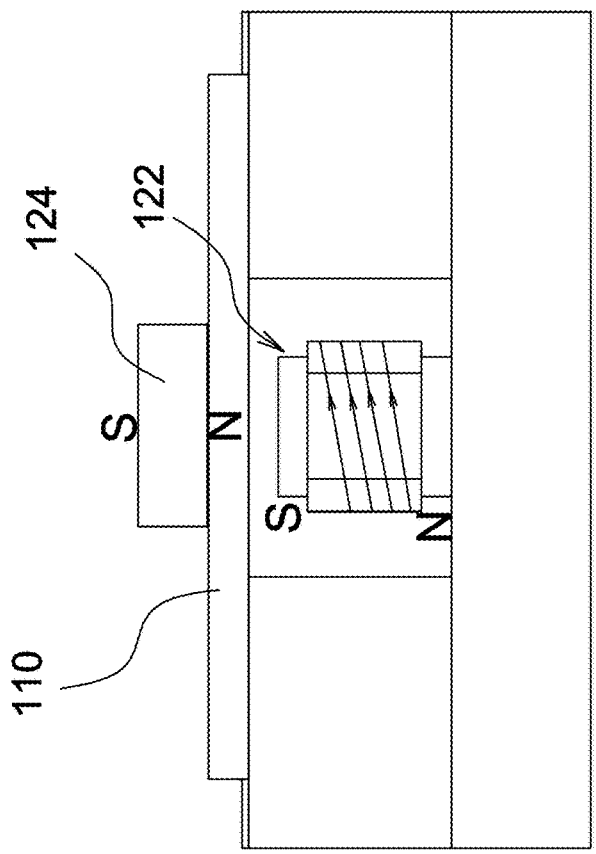

The actuator 120 is not limited to a specific configuration, as long as it may actuate the carrier 110. In one embodiment, as shown in FIG. 2A and FIG. 2B, the opposite north pole N and south pole S of each of the permanent magnet 124 and the electromagnet 122 are aligned in a horizontal direction. In other embodiment, as shown in FIG. 5A and FIG. 5B, the opposite north pole N and south pole S of each of the permanent magnet 124 and the electromagnet 122 are aligned in a vertical direction. Note FIGS. 5A and 5B show that only one north-south polarity alignment is provided, and, in comparison, FIGS. 2A and 2B show that two north-south polarity alignments are respectively provided on the right side and the left side. Therefore, the arrangement shown in FIGS. 2A and 2B may generate a comparatively larger magnetic force (more magnetic field lines). Further, the orientation of the permanent magnet 124 and the electromagnet 122 relative to the axis A and the magnetic field density may vary according to actual demands.

Figure 6:
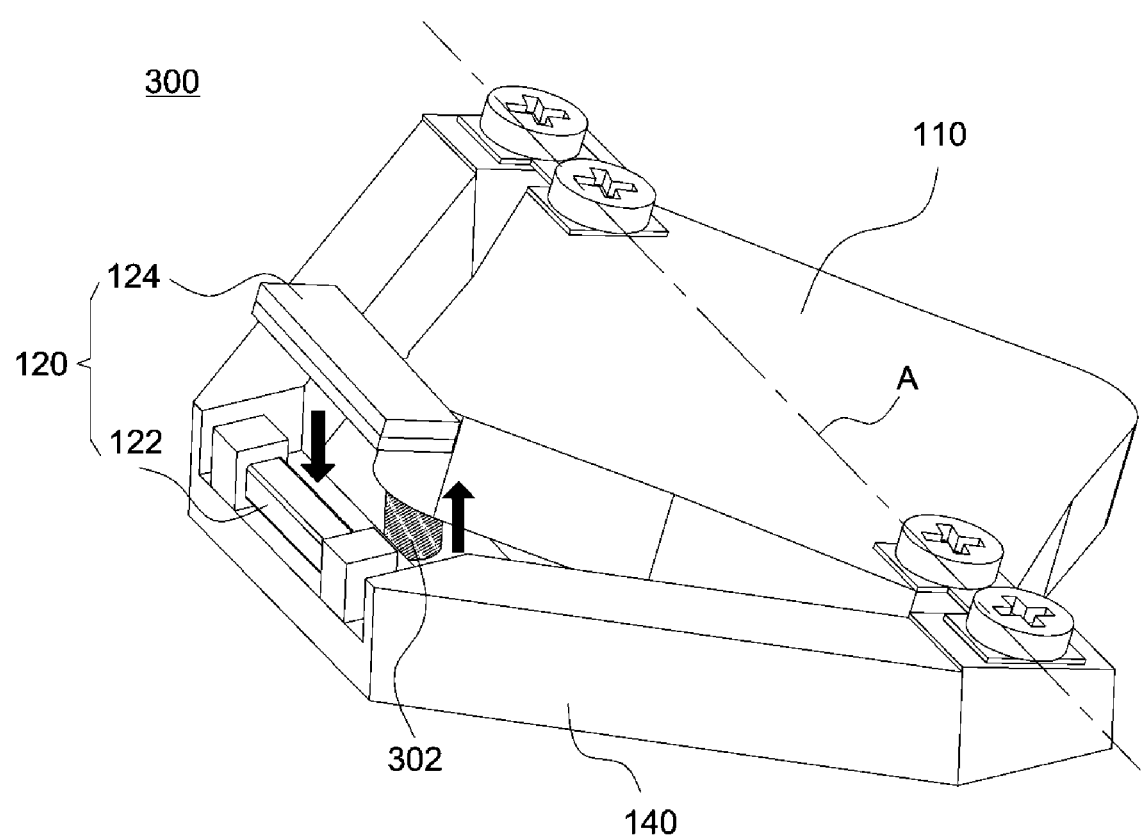
FIG. 6 shows a schematic diagram of a light path adjustment mechanism according to another embodiment of the invention.

FIG. 6 shows a schematic diagram of a light path adjustment mechanism according to another embodiment of the invention. As shown in FIG. 6, the light path adjustment mechanism 300 has an elastic member 302 disposed between the support 140 and one end of the carrier 110 and near the actuator 120. The elastic member 302 may abut against one end of the carrier 110 to hold the carrier 110 in a preset position. When the electromagnet 122 is energized, an attractive force is generated to attract the permanent magnet 124, which causes one end of the carrier 110 to tilt and press the elastic member 302. In contrast, when the electromagnet 122 is de-energized, a restoring force of the elastic member 302 enables the carrier 110 to return to the preset position. In this embodiment, the magnetic attractive force and the resilient restoring force applying in opposite directions may cause the carrier 110 (e.g., including the optical plate member 112 and the mount 114) to tilt between different positions about the axis A, without the need of alternating attractive and repulsive forces (i.e., without the need of changing the flow direction of the current I). Further, in one embodiment, the elastic member 302 may be a bar member (such the first bar 132) that may apply resilient restoring forces to achieve similar effects. Moreover, in one embodiment, the permanent magnet 124 may be replaced with other form of magnetic substance, and the energized electromagnet 122 may attract the magnetic substance to achieve similar effects. For example, the permanent magnet 124 or the electromagnet 122 may be replaced with an air core coil to similarly generate attractive and repulsive forces.

In some embodiments, the permanent magnet 124 is disposed on one end of the carrier 110, and the electromagnet 122 is disposed on the support 140, but the invention is not limited thereto. In other embodiment, the electromagnet 122 may be disposed on one end of the carrier 110, and the permanent magnet 124 may be disposed on the support 140.

According to the above embodiments, at least part of the actuator (such as the permanent magnet or the electromagnet) can be disposed on the carrier to reduce occupied space, weight and component number, thereby realizing a slim and compact light path adjustment mechanism that is advantageously installed in various mini-type electronic devices. Further, the arrangement in which the actuator is disposed on only one side of the optical plate member may further reduce occupied space, weight and fabrication costs. Further, a single actuator that generates both the attractive force and the repulsive force enables the optical plate member to alternately rotate in opposite directions and thus causes the optical plate member to achieve a greater degree of vibration. Therefore, even the actuator is disposed on only one side of the optical plate member, a sufficient angular range of rotation can be still provided.

According to the above embodiments, the bar or elastic member, which is deformed when a load is applied thereon and returns to its original shape and size when the load is removed, may be made from plastic or metal without limitation. Further, the support is simply used for defining an accommodation space and may have any shape or design without limitation. For example, the support may be in the form of a base, outer casing, etc.

In one embodiment, the natural frequency of the carrier may be adjusted by changing pin weight or screw weight, adding a mass block or providing a pressure plate to avoid resonance vibrations. It is also noted that a higher natural frequency may increase the response speed of the carrier and may achieve a desired angular range of rotation by a smaller actuator.

In one embodiment, the light path adjustment mechanism is integrally formed at least in part to reduce the component number, structure complexity and assembly time. For example, the bar, the optical plate member and the mount may be all integrally formed as one piece using the same material (such as plastic or metal), or two of them may be integrally formed as one piece and are then combined with the remainder by pin cementing, adhesive dispensing or screw fastening. In other embodiment, the bar, the optical plate member, the mount and the support may be all integrally formed as one piece using the same material (such as plastic or metal), or two of them may be integrally formed as one piece and are then combined with the remainder.

Figure 7:
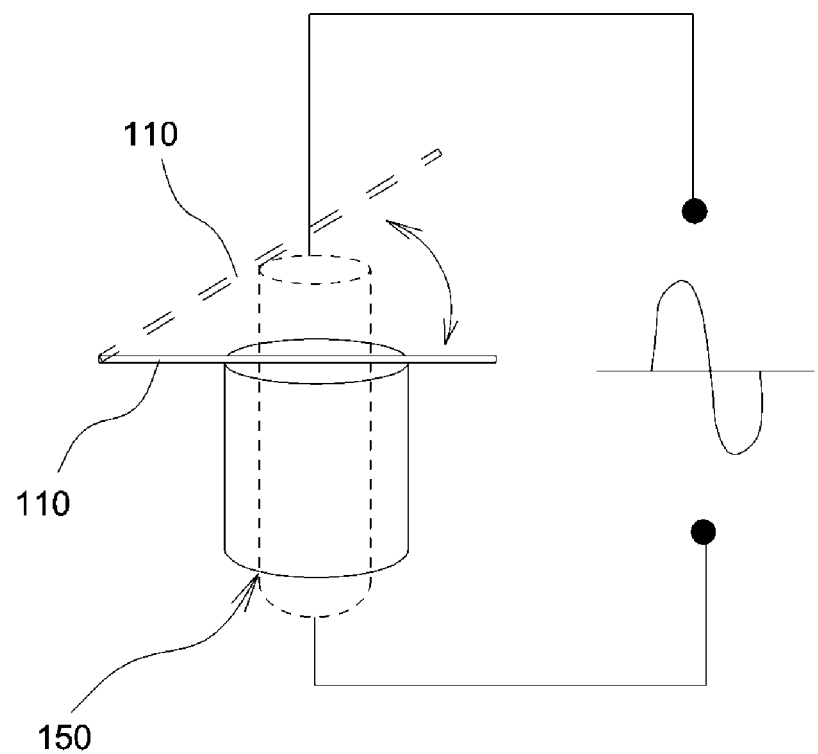
FIG. 7 shows a schematic diagram of an actuator according to another embodiment of the invention.

In other embodiment, as shown in FIG. 7, the actuator may include a piezoelectric element 150 disposed on the carrier 110. The piezoelectric element 150 may deform and change in shape when an electric field is applied, converting electrical energy into mechanical energy, to cause reciprocate movement of the carrier 110.

Figure 8:
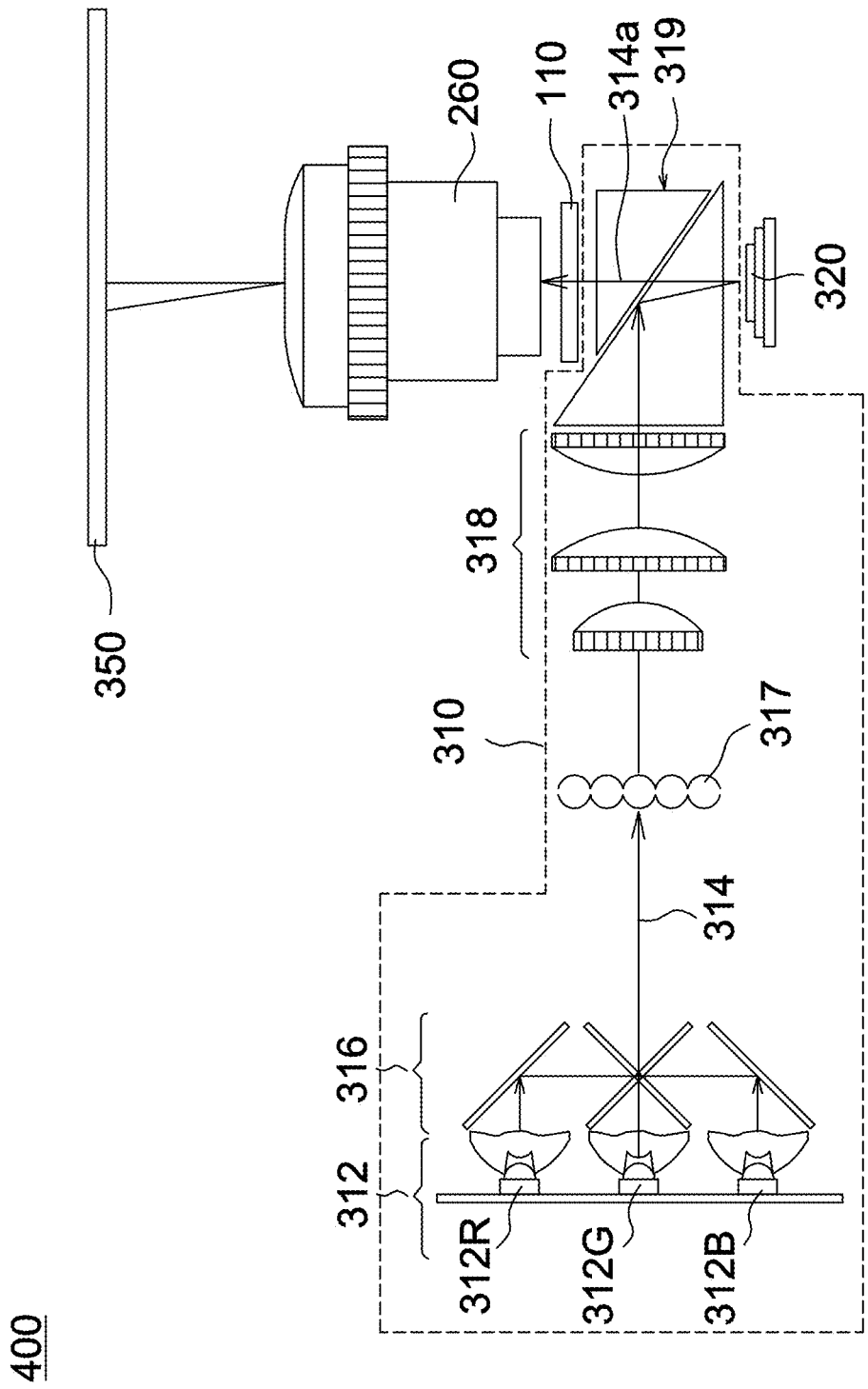
FIG. 8 shows a schematic diagram of a light path adjustment mechanism used in a projector according to an embodiment of the invention.

FIG. 8 shows a schematic diagram of a light path adjustment mechanism used in a projector according to an embodiment of the invention. Referring to FIG. 8, an optical device 400 includes an illumination system 310, a light valve 320, a projection lens 330 and a light path adjustment mechanism 100. The illumination system 310 has a light source 312 for providing a light beam 314, and the light valve 320 is disposed in a propagation path of the light beam 314 and converts the light beam 314 into multiple sub images 314a. Besides, the projection lens 330 is disposed in a propagation path of the sub images 314a, and the light valve 320 is disposed between the illumination system 310 and the projection lens 330. Further, the light path adjustment mechanism 100 is disposed between the light valve 320 and the projection lens 330. For example, the light path adjustment mechanism 100 may be disposed in a propagation path of the sub images 314a and between the light valve 320 and a TIR prism 319 or between the TIR prism 319 and the projection lens 330. The light source 312 may, for example, include a red LED 312R, a green LED 312G and a blue LED 312B. Light from each of the LEDs 312R, 312G and 312B are combined by a light combiner 316 to form the light beam 314, and the light beam 314 passes a fly-eye lens array 317, a lens assembly 318 and the TIR Prism 319 in succession. Then, the light beam 314 is reflected by the TIR Prism 319, directed to the light valve 320, and converted into multiple sub images 314a by the light valve 320. The sub images 314a pass the TIR Prism 319 and the light path adjustment mechanism 100 in succession and are projected on a screen 350 by the projection lens 330. In this embodiment, when the sub images 314a reach the light path adjustment mechanism 100, the light path adjustment mechanism 100 may alter the propagation path of the sub images 314a. Therefore, at a first time point the sub images 314a are projected on a first position (not shown) of the screen 350 by the light path adjustment mechanism 100, at a second time point the sub images 314a are projected on a second position (not shown) of the screen 350 by the light path adjustment mechanism 100, and the second position is away from the first position for a distance in a horizontal (X-axis) direction and/or a vertical (Y-axis) direction. In this embodiment, the light path adjustment mechanism 100 is allowed to horizontally and/or vertically shift the position of the sub images 314*a* for a distance to therefore improve horizontally and/or vertically image resolutions. Although the light path adjustment mechanism is described herein as being applied to the optical device 400, in other embodiments, the light path adjustment mechanism can be applied to different optical systems to achieve different effects without limitation. Besides, the arrangement and position of the light path adjustment mechanism in an optical system is not restricted.

The material of an optical plate member may include plastic or glass, and the optical plate member may be, for example, a lens, a TIR prism, a RTIR prism, a light integrator or a filter.

The term "light valve", which is commonly known in the projector industry, refers to individually-addressed optical units of a spatial light modulator. The spatial light modulator includes multiple individually-addressed optical units arranged as a one-dimensional or a two-dimensional array. Each optical unit can be individually addressed by optical or electrical signals to alter its optical properties through various physical effects (e.g., Pockels effect, Kerr effect, photoacoustic effect, pagneto-optic effect, self electro-optic effect or photorefractive effect). Therefore, the multiple individually addressed optical units may modify incoming light beams and output image beams. The optical units may be, for example, micro mirrors or liquid crystal cells, and the light valve may be a digital micro-mirror device (DMD), a liquid-crystal-on-silicon panel (LCOS panel) or a transmissive type LCD panel.

A projector is an apparatus capable of casting an image on a screen through optical projection. In the projector industry, a variety of different types of projectors, which are distinguished from each other by the type of a light valve, may include a cathode-ray-tube type, a liquid-crystal-display (LCD) type, a digital-light-projector (DLP) type or a liquid-crystal-on-silicon (LCOS) type. An LCD-type projector that uses an LCD as a light valve is a transmissive type projector. A DLP-type projector using digital micro-mirror devices as a light valve and an LCOS-type projector using liquid crystal on silicon as a light valve are reflective type projectors that project images through light reflection. In this embodiment, the projector is a DLP-type projector and the light valve 320 is a digital micro-mirror device.

Though the embodiments of the invention have been presented for purposes of illustration and description, they are not intended to be exhaustive or to limit the invention. Accordingly, many modifications and variations without departing from the spirit of the invention or essential characteristics thereof will be apparent to practitioners skilled in this art. It is intended that the scope of the invention be defined by the claims appended hereto and their equivalents in which all terms are meant in their broadest reasonable sense unless otherwise indicated.

What is claimed is:

1. A light path adjustment mechanism for adjusting a light path of an incoming light beam, comprising:
   a support;
   a carrier comprising an optical plate member and being disposed in the support and connected to the support by a first elastic member and a second elastic member to form a first connection point connected between the first elastic member and the carrier and form a second connection point connected between the second elastic member and the carrier, wherein the carrier is configured to tilt between at least a first position and a second position about an axis, the axis divides the support into a first part and a second part, and the support is so arranged that a plane perpendicular to the axis and intersected with the axis at a midpoint of a line segment between the first connection point and the second connection point crosses the first part of the support and does not cross the second part of the support; and
   a permanent magnet and an electromagnet, an attractive force or a repulsive force generated between the permanent magnet and the electromagnet being capable of acting in a direction substantially perpendicular to the axis, and one end of the carrier being provided with the permanent magnet or the electromagnet.

2. The light path adjustment mechanism as claimed in claim 1, wherein the optical plate member does not overlap the support in a normal direction of the optical plate member.

3. The light path adjustment mechanism as claim in claim 2, wherein a longitudinal direction of the permanent magnet is substantially parallel to the axis.

4. The light path adjustment mechanism as claim in claim 1, wherein the electromagnet comprises a core and a coil winding around the core, and the electromagnet is capable of exchanging magnetic polarities.

5. The light path adjustment mechanism as claim in claim 4, wherein the electromagnet is capable of alternately attracting and repelling the permanent magnet.

6. The light path adjustment mechanism as claim in claim 1, wherein the optical plate member comprises a lens or a mirror.

7. The light path adjustment mechanism as claim in claim 1, further comprising:
   a pad disposed between the carrier and the electromagnet or between the carrier and the permanent magnet.

8. The light path adjustment mechanism as claim in claim 1, further comprising:
   an elastic member disposed between the one end of the carrier and the support.

9. The light path adjustment mechanism as claim in claim 1, wherein the permanent magnet is disposed on the one end of the carrier, and the electromagnet is disposed on the support.

10. The light path adjustment mechanism as claim in claim 1, wherein each of the permanent magnet and the electromagnet has a north pole and a south pole aligned in a horizontal direction to form two north-south polarity alignments.

11. The light path adjustment mechanism as claim in claim 1, wherein each of the permanent magnet and the electromagnet has a north pole and a south pole aligned in a vertical direction to form only one north-south polarity alignment.

12. A light path adjustment mechanism for adjusting a light path of an incoming light beam, comprising:
   a support;
   a carrier configured to tilt between at least a first position and a second position about an axis, the carrier comprising an optical plate member and a mount, and the axis dividing the support into a first part and a second part;
   a first bar and a second bar, the first bar being connected with the support and a first end of the carrier, the second bar being connected with the support and a second end of the carrier; and
   an actuator comprising a permanent magnet for actuating the carrier, the axis dividing the carrier into a first part and a second part, and the actuator being disposed in either the first part or the second part of the carrier, wherein the support is so arranged that a plane perpendicular to the axis and dividing the permanent magnet into two equal parts crosses the first part of the support and does not cross the second part of the support.

13. The light path adjustment mechanism as claim in claim 12, wherein the actuator further comprises an electromagnet, and an attractive force or a repulsive force generated between the permanent magnet and the electromagnet.

14. The light path adjustment mechanism as claim in claim 13, wherein the permanent magnet is disposed on the carrier, and the electromagnet is disposed on the support.

15. The light path adjustment mechanism as claim in claim 13, wherein a longitudinal direction of the permanent magnet is substantially parallel to the axis.

16. The light path adjustment mechanism as claim in claim 13, wherein the electromagnet comprises a core and a coil winding around the core, and the electromagnet is capable of alternately attracting and repelling the permanent magnet.

17. The light path adjustment mechanism as claim in claim 12, wherein the optical plate member comprises a lens or a mirror, and the mount is integrally formed as one piece with the optical plate member.

18. The light path adjustment mechanism as claim in claim 12, further comprising:
   a pad disposed between the carrier and the electromagnet or between the carrier and the permanent magnet.

19. The light path adjustment mechanism as claim in claim 12, further comprising:
   an elastic member disposed near the actuator and abutting against the carrier.

20. A light path adjustment mechanism for adjusting a light path of an incoming light beam, comprising:
   a support;
   a carrier configured to tilt between at least a first position and a second position about only one axis, the carrier comprising an optical plate member and a mount, wherein the carrier is actuated by an actuator, and the only one axis divides the support into a first part and a second part;
   a first bar and a second bar, the first bar being connected with the support and a first end of the carrier to form a first connection point connected between the first bar and the carrier, the second bar being connected with the support and a second end of the carrier to form a second connection point connected between the second bar and the carrier, wherein the support is so arranged that a plane perpendicular to the axis and intersected with the axis at a midpoint of a line segment between the first connection point and the second connection point crosses the first part of the support and does not cross the second part of the support.

* * * * *